(12) United States Patent
Hurley

(10) Patent No.: US 8,401,811 B1
(45) Date of Patent: *Mar. 19, 2013

(54) FLOW TESTING SYSTEM FOR FLUID NETWORKS

(76) Inventor: Lyndon J. Hurley, Harrisburg, SD (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/041,842

(22) Filed: Mar. 7, 2011

Related U.S. Application Data

(60) Division of application No. 12/072,515, filed on Feb. 27, 2008, now Pat. No. 7,917,324, which is a continuation-in-part of application No. 11/800,563, filed on May 7, 2007, now Pat. No. 7,983,869.

(51) Int. Cl.
*G01F 1/46* (2006.01)
(52) U.S. Cl. ....................................... 702/114
(58) Field of Classification Search .................. 702/114
See application file for complete search history.

(56) References Cited

U.S. PATENT DOCUMENTS

| | | | |
|---|---|---|---|
| 1,973,340 A | 11/1934 | Norman | |
| 2,548,146 A | 4/1951 | Ferris | |
| 2,548,147 A | 4/1951 | Ferris | |
| 2,746,720 A | 5/1956 | Cannon | |
| 3,417,953 A | 12/1968 | Hillquist | |
| 3,565,372 A | 2/1971 | Jones | |
| 3,572,380 A | 2/1971 | Jackson | |
| 4,063,359 A | 12/1977 | Luscombe | |
| 4,183,489 A | 1/1980 | Copher | |
| 4,463,858 A | 8/1984 | Bilas | |
| 4,478,041 A | 10/1984 | Pollman | |
| 4,481,770 A | 11/1984 | Lohbauer | |
| 4,523,286 A | 6/1985 | Koga | |
| 4,561,459 A | 12/1985 | Jackman | |
| 4,600,364 A | 7/1986 | Nakatani | |
| 4,869,002 A | 9/1989 | Glenn | |
| 4,883,249 A | 11/1989 | Garland | |
| 4,961,471 A | 10/1990 | Ovens | |
| 4,987,690 A | 1/1991 | Aaldenberg | |
| 5,299,770 A | 4/1994 | Sayles | |
| 5,330,014 A | 7/1994 | Wagner | |
| 5,381,996 A | 1/1995 | Arnemann | |
| 5,503,423 A | 4/1996 | Roberts | |
| 5,540,006 A | 7/1996 | Lloyd | |
| 5,556,217 A | 9/1996 | Deyo | |
| 5,560,130 A | 10/1996 | Bapst | |
| 5,662,176 A | 9/1997 | Madgwick | |
| 5,746,404 A | 5/1998 | Merko | |
| 5,809,779 A | 9/1998 | Bruso | |
| 5,876,005 A | 3/1999 | Vasconi | |

(Continued)

FOREIGN PATENT DOCUMENTS

EP 089412 9/1983

OTHER PUBLICATIONS

The Wachs Company, "Automated Valve Operating Systems", Brochure, pp. 1-6, Mar. 1, 2004.

(Continued)

*Primary Examiner* — Tung S Lau
(74) *Attorney, Agent, or Firm* — Jeffrey A. Proehl; Woods, Fuller, Shultz & Smith, PC

(57) ABSTRACT

An apparatus, system, method and kit for testing fluid flow and pressure is provided. The apparatus, system, method and kit include or include the use of a flow unit which is configured to measure flow rate and/or flow velocity when interfaced with a flow valve or hydrant and a pressure unit configured to measure at least residual pressure when interfaced with a test valve or hydrant. At least one of the units is configured to wirelessly send data transmissions to the other unit which is configured to receive such transmissions.

7 Claims, 7 Drawing Sheets

U.S. PATENT DOCUMENTS

| | | | |
|---|---|---|---|
| 5,937,373 A | 8/1999 | Ferrar | |
| 6,009,905 A | 1/2000 | Arnemann | |
| 6,056,065 A | 5/2000 | Campbell | |
| 6,125,868 A | 10/2000 | Murphy | |
| 6,129,371 A | 10/2000 | Powell | |
| 6,131,381 A | 10/2000 | Milbury | |
| 6,142,180 A | 11/2000 | Woodling | |
| 6,155,359 A | 12/2000 | Gardner | |
| 6,179,068 B1 | 1/2001 | West | |
| 6,550,734 B1 | 4/2003 | Spadea | |
| 6,701,913 B1 | 3/2004 | LeDuc et al. | |
| 7,017,406 B1 | 3/2006 | Cressman | |
| 7,036,606 B2 | 5/2006 | Rossi | |
| 7,917,324 B2 * | 3/2011 | Hurley | 702/114 |
| 7,983,869 B1 * | 7/2011 | Hurley | 702/114 |
| 2001/0053970 A1 | 12/2001 | Ford | |
| 2003/0107485 A1* | 6/2003 | Zoratti | 340/568.1 |
| 2005/0075817 A1 | 4/2005 | Kah | |
| 2005/0076965 A1 | 4/2005 | Buckner | |
| 2005/0166350 A1 | 8/2005 | Buckner | |
| 2009/0319572 A1 | 12/2009 | Bernard | |

OTHER PUBLICATIONS

E.H. Wachs Companies, "Truck Mounted Valve Operator Model TM-7", Product Manual, Jan. 2004, pp. 1-55.

E.H. Wachs Companies, "Wachs ValveCard 1.2", Product Manual, Sep. 1998, pp. 1-26.

Telog Instruments, "Hydrant Pressure Monitoring" Internet Brochure available at www.telog.com/flash/downloads/hpr_suite.pdf, Jan. 21, 2008.

Holden & Brook Limited, "Packaged Fire Hydrant Pump Sets" Brochure, Apr. 1989, pp. 1-4, Manchester, England.

Macarena Cavestany Olivares, "Characterization of Irrigation Hydrants and Influence of Their Wrong Behavior on the Performance of an Irrigation Network", Aug. 23, 2006, pp. 1-90.

National Fire Protection Association, "Recommended Practice for Fire Flow Testing and Marking of Hydrants", 2002 Edition, 18 pages.

* cited by examiner

FLOW TESTING SYSTEM FOR FLUID NETWORKS

This is a continuation-in-part application of application Ser. No. 11/800,563, filed May 7, 2007 which is incorporated by reference as if fully rewritten herein.

FIELD

The present invention relates to an apparatus, system, method and kit for testing fluid flow and pressure, and more particularly, pertains to flow and pressure testing of fluid networks that permits testing of a valve or hydrant on a water supply system by a single person in a highly automated and accurate manner.

BACKGROUND AND DESCRIPTION OF THE PRIOR ART

Fluid supply networks, such as municipal water supply systems, typically test the flow and pressure characteristics of outlets, such as hydrants, on the system to determine the capabilities of the system to deliver an adequate flow of water during high water use events such as the fighting of a fire using water from the supply system.

Not only are these characteristics of the municipal water supply system a concern of the municipality in gauging the likely ability of the fire department to fight fires, but insurers of property are also concerned with this capacity in setting insurance rates for the property. Accurate and current data for each hydrant indicates how much water is available from each hydrant, which may affect fire suppression practices at different points on the system so as not to place greater fire fighting water demands on the hydrant than the individual hydrant or hydrants can supply. The hydrant flow characteristics are not measured in isolation from other proximate hydrants, so that fire fighting personnel are aware whether the system will support the use of multiple proximate hydrants without simply diverting the flow from hydrants already opened and being utilized. Additionally, the use of fire fighting equipment to draw water from the hydrant using a pump can increase the flow capacity of water from the water supply system, but attempting to pump water from the hydrant in excess of the safe capacity of water available from the hydrant at that point in the supply system can have effects detrimental to the system due to the creation of a negative pressure condition created in the main. These detrimental effects include triggering a collapse of the water main or the introduction of contaminants into the main through cracks or joints in the pipe. Thus, knowledge of the actual flow capabilities of the water supply system at a hydrant is needed as guidance to fire fighting personnel seeking to draw water from the hydrant in emergencies.

Similarly, in an actual firefighting situation, it is desirable to monitor the residual pressure in the water supply system as water is being pumped or drawn out of the supply system by fire fighting equipment to ensure that the pressure in the supply system does not fall below a desired threshold pressure and possibly cause the aforementioned problems.

Further, flow test data can provide information about the water supply system so that system managers can estimate the capabilities of water mains, such as flow rates, and plan system upgrades and expansions or determine the resistance to water or fluid flow in a fluid main. The latter resistance and flow velocity may be used by engineers, such as by coefficient factor (C-factor) testing, to determine if a main is plugging or becoming clogged. In this latter testing, flow velocity (V) is related to a flow coefficient (C) by the Hazen-Williams flow formula:

$$V = 1.318 C (R_H)^{0.63} (S)^{0.54}$$

Where:
V=flow velocity, ft/s
C=flow coefficient
$R_H$=hydraulic radius, ft
  Note: $R_H = \frac{1}{4}(D_i)$ for pipe flowing full or half full
S=hydraulic slope, ft/ft
$D_i$=pipe inside diameter, ft
Also, $$Q = 0.006756 C D_i^{2.63} f^{0.54}$$

Where:
Q=flow rate, gal/min
C=flow coefficient
$D_i$=pipe inside diameter, in
f=head loss, ft of $H_2O$/1000 ft $$f = 0.2083 \left[\frac{100}{C}\right]^{1.85} \frac{Q^{1.85}}{D_i^{4.86}}$$

Where:
f=friction loss, ft of $H_2O$/100 ft
C=flow coefficient
Q=flow rate, gal/min
$D_i$=pipe inside diameter, in
Flow rate (e.g., gal/minutes) from a hydrant is related to the flow coefficient C and pressures in the systems as follows:

$$Q = 0.442 D_i^{2.63} C \left[\frac{P_1 - P_2}{L}\right]^{0.54}$$

Where:
Q=flow rate, gal/min
$D_i$=pipe inside diameter, in
C=flow coefficient
$P_1$, $P_2$=gauge pressures, psi
L=pipe length, ft Hydrant flow characteristics can affect decisions as to what fire protection and fire resistance features are required for areas of new developments, and where priorities should be placed with respect to upgrading older, smaller water mains. Such testing can indicate systemic weaknesses such as main clogging, failing water mains such as when residual pressures imposed upon water mains become too high by pulling water from the main at a flow hydrant, and compromised valves.

Testing is typically conducted on a periodic basis, since water supply systems are constantly being affected by changing conditions, including improvements to the system, deterioration of parts of the system, and changes in usage of the system, etc. The testing of hydrants in a water supply system may follow the requirements of National Fire Protection Association (NFPA) No. 291, entitled "First Flow Testing and Marking of Hydrants". In general, the testing of hydrants in a municipal water supply system where the testing is directed to flow rates and the effect thereof. These tests involve the measurement of static pressure, residual pressure and pitot pressure with respect to the subject hydrant being tested (a test hydrant). C-factor testing may only involve measuring or determining flow velocity simultaneously with residual pressure and calculating resistance to fluid flow using other known characteristics of the system. However, the procedures of both of these tests are not performed only at the subject hydrant being tested, but also at another hydrant on the same water supply system as the subject test hydrant. This testing provides an accurate idea of the subject hydrant's individual characteristics and efficiency as well as other characteristics of the system such as a flow coefficient. More specifically, as to flow characteristics which involve the effect of flow rate on a system, static pressure and then residual pressure are measured at the subject test hydrant, while pitot pressure is measured in a flow of water at a proximate location on the water supply system, such as a fire hydrant (the "flow hydrant") downstream or adjacent to the subject hydrant being tested on the water supply system (adjacent especially in the case of determining the effect of flow rate on residual pressure, or other access points to the water flow, even from a nearby residential water service). In the latter circumstance when determining the effect of flow rate on residual pressure, because the water in the supply system is flowing at the proximate or adjacent flow hydrant, measurements taken at the subject test hydrant are substantially isolated from effects such as friction loss, and the measurements of these characteristics is thus more accurate.

It will be noted that although the hydrants are proximate or adjacent to each other in the water supply system, the hydrants are typically widely separated in a geographic sense, and personnel are usually stationed at each of the hydrants to conduct the testing.

Just as significant as the physical separation of the subject test hydrant and the proximate flow hydrant is the temporal requirements of the testing. More specifically, while the static pressure is typically measured at the subject test hydrant in testing involving flow rate and the effects thereof just prior to opening the proximate flow hydrant to flow water from the system, the measurement of pitot pressure at the proximate flow hydrant and residual pressure at the subject test hydrant must occur simultaneously or substantially simultaneously. Substantially simultaneously means that errors caused by not precisely temporally linking the determined residual pressure with a determined flow rate using pitot pressure should not exceed 10% and preferably not more than 5% and even more preferably not more than 1%.

In the past systems, methods and apparatuses used in flow rate, flow velocity or C-factor testing, one person alone has not been able to accurately conduct these tests because of the geographical and temporal requirements of these tests. Whether involving flow rate testing or flow velocity used in C-factor testing, in the past at least two persons have been required to take action at each hydrant, the test hydrant and flow hydrant. Thus, the expense of the testing process is increased by the personnel costs. Also, the simultaneous timing of the measurements has not been always reliable, as clocks must be synchronized and/or the testing personnel must communicate the exact time of the taking of the measurement, once the proximate hydrant valve has been fully opened and the pressure in the water main has stabilized. Communication of this timing is thus often performed verbally by the personnel over a portable radio system. Also, there is rarely, if ever, any independent verification of the simultaneous timing of the taking of these measurements.

Testing equipment which monitors pressure at fire hydrants are known where a hydrant pressure measuring device and recorder are attached to a hydrant being tested for static and residual pressure as well as attached to a hydrant which is permitted to flow and flow rate is determined. In these systems a hand held computer or personal digital assistant is configured to download pressure or flow data being measured at each hydrant. Clocks in each unit on each hydrant are carefully synchronized so that data being measured at each hydrant can be correlated and the effect of fluid flow at a flow rate at a flow hydrant can be seen on a residual pressure on a test hydrant. There is no communication between the devices on each hydrant to assure that the collected data concerning a pitot pressure and/or flow rate will directly correlate to a residual pressure being measured at a test hydrant. Moreover, for these types of devices to work, their clocks at each hydrant have to be carefully and precisely synchronized.

Further increasing the expense and complication of the testing are situations where more than one hydrant needs to be opened to achieve a desirable drop in residual pressure approaching 25 percent from the static pressure. This adds to the personnel expense and complication to the timing of the opening of the hydrants.

In the fire-fighting situation, where it is desirable to monitor the pressure in the water supply system and the effect on such pressure of a flow rate from a flow hydrant, an additional fire fighter or municipal employee must be stationed at a hydrant proximate to the flow hydrant from which water is being drawn in order to monitor the residual pressure in the supply system. This situation thus also requires additional personnel simply to monitor flow conditions in the supply system. In fire fighting situations, the term "fire flow" is sometimes used. As discussed herein, fire flow means the rate at which water may be drawn from the system (such as gallons per minute) without the residual pressure dropping below 20 psi.

It is also desirable to coordinate the opening of the proximate hydrant (or the downstream hydrant in the case of C-factor testing) and the taking of pressure and flow readings in order to minimize the time that the flow hydrant is opened. This minimizes the amount of water that flows from the proximate or downstream flow hydrant, and thereby minimizes the amount of water that is wasted and that needs to be disposed of.

Using the static, pitot, and residual pressure measurements, the flow rate in gallons per minute may be calculated using the formula:

$$Q=29.83cd^2\sqrt{p},$$

where Q=observed flow, c=coefficient, d=outlet diameter, p=pitot pressure.

The available flow may be calculated, subject to some qualifications, using the formula:

$$Q_R = Q_F \times \frac{h_r^{0.54}}{h_f^{0.54}}$$

where $Q_r$=observed flow, $h_r$ is the drop in pressure from the static pressure to the desired residual baseline and $h_f$ is the drop in psi from static pressure to the actual residual pressure that was measured during the test.

Due to the accuracy required in making the measurements, and the labor intensive nature of the taking of the measurements over sometimes long distances, it is believed that there is needed a system for administering and recording data relative to flow testing for the effect of flow rate on residual pressure or for C-factor testing involving flow velocity and conducting these tests in a manner that is able to increase the accuracy of and decrease the personnel needed for such tests. These measurements not only include measurements of static and residual pressures, determination of flow rates and flow velocities such as from measuring pitot pressure, but also include identifying specific geographical locations of test and flow hydrants using a global positioning system (GPS), correlating the data to record the location of each hydrant into a memory or storage device and associating the location of each hydrant with the data taken at each hydrant. Hence, there is not only a need for making measurements concerning hydrants and valves with devices which "talk" to each other via wireless communications, but also geographically map the hydrants or valve system and associate the measurements taken as to the hydrant or valve with a position on the geographical map.

SUMMARY

In view of the foregoing disadvantages inherent in the known techniques for flow testing now employed, a new flow testing apparatus, system, kit and method for testing are provided. In one aspect the latter apparatus, kit, system and method also permit mapping fluid networks. The new apparatus, system, kit and method permit the measurement of flow rates, flow velocities, static pressures, residual pressures and C-factor testing as part of conducting flow testing of a valve or hydrant on a fluid flow supply network as well as mapping the network, and most particularly a water supply network. The new apparatus, kit, system and method contemplate all of this testing by a single person in a highly automated and accurate manner.

To attain the above, in one aspect of the apparatus, system, kit and method described herein, a flow and pressure testing apparatus and flow and pressure testing system is disclosed for conducting a test event which detects and/or determines the fluid characteristics in a network of fluid-carrying pipes. The apparatus and system comprise a flow unit configured to interface with a flow hydrant and determine or measure flow characteristics of fluid from the flow hydrant, a pressure unit configured to interface with a test hydrant remote from the flow hydrant and configured to measure pressure characteristics of fluid at the test hydrant, a transmitter in a first one of the units configured to transmit data representative of the measurements taken at one unit to a second one of the units, a receiver in the second one of the units configured to receive data from the transmitter of the first unit, and a data storage medium in the second unit configured to record data representative of the measurements, with the data including data, such as pressure data, from the first unit.

In another aspect, a testing apparatus and system are provided which include the flow unit configured to wirelessly communicate with the pressure unit and/or the pressure unit configured to wirelessly communicate with the flow unit in real time during testing. The data taken with the flow unit and/or pressure unit is stored in one or more storage mediums at the pressure unit and/or flow unit as it is taken and is transmitted by transmitters to receivers in one or both units. In this way the flow unit configured to interface with a flow valve or hydrant measures and/or determines fluid flow characteristics, such as flow rate, flow velocity or both, of the flow hydrant and may record these fluid flow characteristics of the flow hydrant in the form of pitot pressure (measured with a pressure sensor at the pitot) from which the fluid flow may be determined by calculation with a computer which is either hard wired or wirelessly interfaced with the flow unit. Alternatively, the fluid flow may be directly measured by measuring the fluid flow rate or velocity from the flow valve or hydrant. The pressure unit configured to interface with a test valve or hydrant measures the residual pressure of fluid at the test valve or hydrant after fluid flow at the flow valve or hydrant is initiated. Additionally, and in an important aspect, the pressure unit may be configured to measure the static pressure of fluid at the test valve or hydrant prior to measuring the residual pressure at the test hydrant.

In measuring flow rate and its effect on residual pressure, the pressure unit which includes a pressure measuring device, such as a pressure transducer, is interfaced with the test hydrant and a flow unit with a pressure measuring device, such as a pitot, is interfaced with a flow hydrant. The pressure measuring device measures a static pressure (before there is flow from the flow hydrant) and communicates data representative of that pressure to a transmitter for further communication to the flow unit. The measurement of static pressure and communication thereof may be spontaneous when power is provided to the transmitter of the pressure unit or may be initiated by a button or the like from the flow unit or the pressure unit. The start of the measurement of static pressure may be initiated from the flow valve or hydrant by a radio transmission (RF) of a "start" signal from the flow unit at the flow hydrant to a receiver at the test valve. After static pressure is determined, flow from the flow hydrant is immediately initiated, or when a certain amount of data concerning static pressure is taken or recorded. After flow is initiated from the flow valve or hydrant, measurement of residual pressure is made at the test hydrant. Data taken at the flow unit representative of pitot pressure, and optionally data representative of calculated or measured flow rate of fluid measured by the flow unit, is stored therein or is transmitted to the pressure unit for storage in the pressure unit. Data taken at the pressure unit representative of static pressure and residual pressure of fluid at the test valve or hydrant is stored therein or is transmitted to the flow unit for storage in the flow unit or both the flow unit and pressure unit. Data taken at the pressure and flow units may be stored in both units.

In another aspect, a method is disclosed for testing fluid flow in a network of fluid carrying pipes. The method includes providing a pressure unit and a flow unit, the pressure and the flow units being separately moveable with respect to each other. Thereafter the pressure unit is interfaced with the test hydrant and the flow unit is interfaced with the flow hydrant with initiation of a flow of water through the flow hydrant. With the initiation of flow through the flow unit, the flow characteristics of fluid flowing from the flow hydrant are measured, such as by measuring the pitot pressure of the fluid flow from the flow hydrant. These characteristics may be flow rate and/or flow velocity both of which can be directly measured or determined from pitot pressure. Further, residual pressure in the test hydrant is measured substantially simultaneously with determining the flow characteristics at the flow hydrant (such as measuring the pitot pressure). Thereafter data representative of the residual pressure measurements are wirelessly transmitted from the pressure unit to the flow unit, and optionally data representative of the flow characteristics measured at the flow unit (pitot pressure or directly measured flow rate and/or velocity) are transmitted from the flow unit to the pressure unit. The flow characteristics of the flow hydrant and the residual pressure measurement at the pressure unit are recorded and stored in a storage medium at the flow unit and/or pressure unit.

Additionally in the method when the effects of flow rate and its effect on residual pressure are to be determined, prior to initiating a flow of water through the flow hydrant, static pressure of the fluid at the test hydrant is measured. In this aspect of the method, data representative of the static pressure may be communicated to a storage unit in the pressure unit or wirelessly communicated to the flow unit or both. After initiation of fluid flow from the flow valve or hydrant, the pitot pressure is measured at the flow hydrant, the flow rate of the fluid flow at the flow valve or hydrant is determined and data representative of such measurements are stored in the flow unit and may be wirelessly communicated to a storage unit in the pressure unit. In general the method as it relates to flow rate and the determination of its effect on residual pressure and the determination of the flow characteristics on a valve or hydrant can be generally described as interfacing the pressure unit to a test hydrant; interfacing the flow unit to a flow hydrant; measuring a static pressure of the fluid at the test hydrant with the pressure unit; after measuring the static pressure at the test hydrant, initiating a flow of water through the flow hydrant; determining the flow characteristics of the flow from the flow hydrant; measuring a residual pressure in the test hydrant after fluid is flowing from the flow hydrant substantially simultaneously with determining the flow characteristics of the flow from the flow hydrant; wirelessly transmitting data representative of at least one of the static and residual pressure measurements from the pressure unit to the flow unit; and optionally wirelessly transmitting data representative of the of characteristics of the flow unit to the pressure unit; and recording data representative of the flow characteristics, static pressure and the residual pressure measurement in a storage medium in at least one of the units. Because of the flow velocity also can be determined from pitot pressure, the data obtained in this test can be used to determine flow velocity, and friction losses using the equations described above.

In yet another aspect a Global Positioning System (GPS) using a Global Navigation Satellite System (GNSS) is part of a system, apparatus, kit and method used to map a hydrant or valve system. The mapping method includes providing a flow unit and a pressure unit, the flow unit and the pressure unit being units separately moveable with respect to each other; interfacing the pressure unit to a test hydrant; interfacing the flow unit to a flow hydrant; optionally measuring a static pressure of the fluid at the test hydrant with the pressure unit; after optionally measuring the static pressure at the test hydrant, initiating a flow of water through the flow hydrant; determining the flow characteristics of the flow from the flow hydrant; measuring a residual pressure in the test hydrant substantially simultaneously with determining the flow characteristics of the flow from the flow hydrant; wirelessly transmitting data representative of at least one of the static and residual pressure measurements from the pressure unit to the flow unit, and optionally wirelessly transmitting data representative of the characteristics of the flow unit to the pressure unit; determining the location of at least one of the units with at least one global positioning system which locates the position of at least one of the units and provides geographical data which identifies the position of the at least one of the units; associating data representative of at least some of the measurements taken at least one of the units with data which identifies the position bf the at least one of the units; and recording data representative of the flow characteristics and the optional static pressure measurement and residual pressure measurement in a storage medium in at least one of the units.

In another aspect, a system for practicing the mapping is provided where the system includes a flow unit configured to interface with a flow hydrant and being configured to determine flow characteristics of the flow hydrant; a pressure unit configured to interface with a test hydrant and configured to measure residual pressure at the test hydrant, and in an important aspect the pressure unit is configured to measure the static and residual pressures at the test hydrant, the pressure unit and flow unit configured to measure residual pressure and determine the flow characteristics at the flow hydrant at substantially the same time; a transmitter in at least one of the units, the transmitter configured for wireless communication and effective for wirelessly communicating data representative of measurements taken in the at least one of the units; a receiver in at least one of the units, the receiver configured for receipt of wireless communication and effective for receiving data in the wireless communication representative of measurements taken in the other unit and communicated to the receiver; at least one global positioning system which locates the position of at least one of the units and provides geographical data which identifies the position of the at least one of the units; a computer control which calculates flow characteristics from the data taken at the units and which associates data relating to at least some of the measurements taken at least one of the units with data which identifies the position of the at least one of the units; and at least one data storage device, the system effective for wirelessly communicating data representative of the measurements made at one of the units and receiving the communication at the other unit and storing data representative of the measurements taken by both units, the system being configured to measure, transmit and record data representative of the static pressure if measured, and thereafter measure, transmit and record data representative of the residual pressure and flow characteristics, the latter measurements being made at about the same time.

In yet another aspect an apparatus which is effective for measuring pressure at a hydrant and wirelessly communicating data representative of a measured pressure to another hydrant is described herein. The apparatus includes a pressure measuring device which is mountable on the hydrant; a transmitter which is effective for wirelessly transmitting data representative of a measured pressure at the hydrant to a receiver at another hydrant; and a storage medium which is effective for storage of the data representative of the measurements taken at least one of the hydrants. In one aspect the apparatus includes a receiver for receiving data wirelessly transmitted from the other hydrant. This receiver should be in communication with the storage medium for storing data from the other hydrant. In one aspect, the apparatus also may include a pressure measuring device which is effective for measuring pitot pressure from which flow rate and flow velocity may be determined. In another aspect the apparatus includes a pressure measuring device effective for measuring static and residual pressure. Further, and in an important aspect, the apparatus includes a GPS which locates the position of the apparatus when mounted on a hydrant or valve and a computer control (hard wired or wirelessly connected to the flow unit) which calculates fluid flow from the measured pitot pressure and associates data regarding measurements taken by the apparatus with the data from the GPS.

Is still another aspect, a kit is provided herein which is used to move the apparatus and systems described herein. The kit includes a hand carryable case, preferably with a handle, which may be padded to accommodate at least two of the apparatuses described herein. The case is much like a padded brief case adapted to carry the apparatus described herein. One of the apparatuses in the kit is a flow unit configured to interface with a flow hydrant and being configured to determine flow characteristics of the flow hydrant, such as having a pressure sensor being effective to measure pitot pressure at a pitot when the flow hydrant is opened. A second unit is a pressure unit configured to interface with a test hydrant and configured to measure residual pressure of the test hydrant with a pressure sensor, and in an important aspect, static pressure and residual pressure. When mounted on hydrants or valves, the pressure unit and flow unit are configured to measure residual pressure and determine the flow characteristics at the flow hydrant at about the same time. There is a transmitter in at least one of the units, preferably both. The transmitter is configured for wireless communication and effective for wirelessly communicating data representative of measurements taken in the at least one of the units. Further, there is a receiver in at least one of the units, preferably both. Each receiver is configured for receipt of wireless communications and effective for receiving data in the wireless communications representative of measurements taken in the other unit and communicated to the receiver. At least one of the units, and preferably both, includes at least one data storage device which stores data representative of measurements and calculations made at or by or at one or both units when operated in connection with the valve or hydrant. When operated together the units provide a system effective for wirelessly communicating data representative of the measurement of data in one of the units and receiving the communication at the other unit and storing data representative of the measurements of data by both units, the system being configured to measure and record data representative of the pitot pressure, measure, transmit and record data representative of residual pressure, and measure residual pressure and flow characteristics at about the same time. In an important aspect, the unit configured to interface with the test hydrant with a cap which will screw onto the test hydrant and then measure residual pressure as well as being configured to measure static pressure as well. Further, the kit may include a GPS which locates the position of one of the units when it is mounted on a hydrant or valve and a computer control which calculates fluid flow from the measured pitot pressure and associates data regarding measurements taken by the units with the data from the GPS. Further, in an important aspect, both units in the kit include a GPS.

There has thus been outlined, rather broadly, the more important features of the apparatus, system and method described herein in order that the following detailed description may be better understood, and in order that the present contribution to the art may be better appreciated. There are additional features of the invention that will be described hereinafter and which will form the subject matter of the claims appended hereto.

One significant advantage of the present invention is the provision of a system for conducting flow testing of a hydrant on the water supply system by a single person in a highly automated and accurate manner with the components of the device wirelessly communicating with each other. Moreover, the another advantage of the new apparatus, kit, system and method described herein is that it may be advantageously used for coefficient factor (C-Factor) testing to determine the resistance to the flow of fluid in a pipe system such as a water main. In applying such testing to water mains, the test can cover several city blocks and by pass several valves or hydrants. Yet C-Factor testing includes the determining a residual pressure, the determination of flow at a flow hydrant (the flow generally calculated using pitot pressure, or actual measurement) and then determining the resistance to fluid flow via a calculation using the length of the main, inner diameter of the pipe or main, residual pressure of a test hydrant and the flow velocity at a flow hydrant downstream of a test hydrant.

Further advantages of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The apparatus, system and method will be better understood and objects of the apparatus, system and method will become apparent when consideration is given to the following detailed description therefor. Such description makes reference to the annexed drawings described below.

DETAILED DESCRIPTION

With reference now to the drawings, and in particular to FIGS. 1 through 7 thereof, a new apparatus, system and method for testing fluid flow and pressures in fluid networks will be described.

Figure 1:
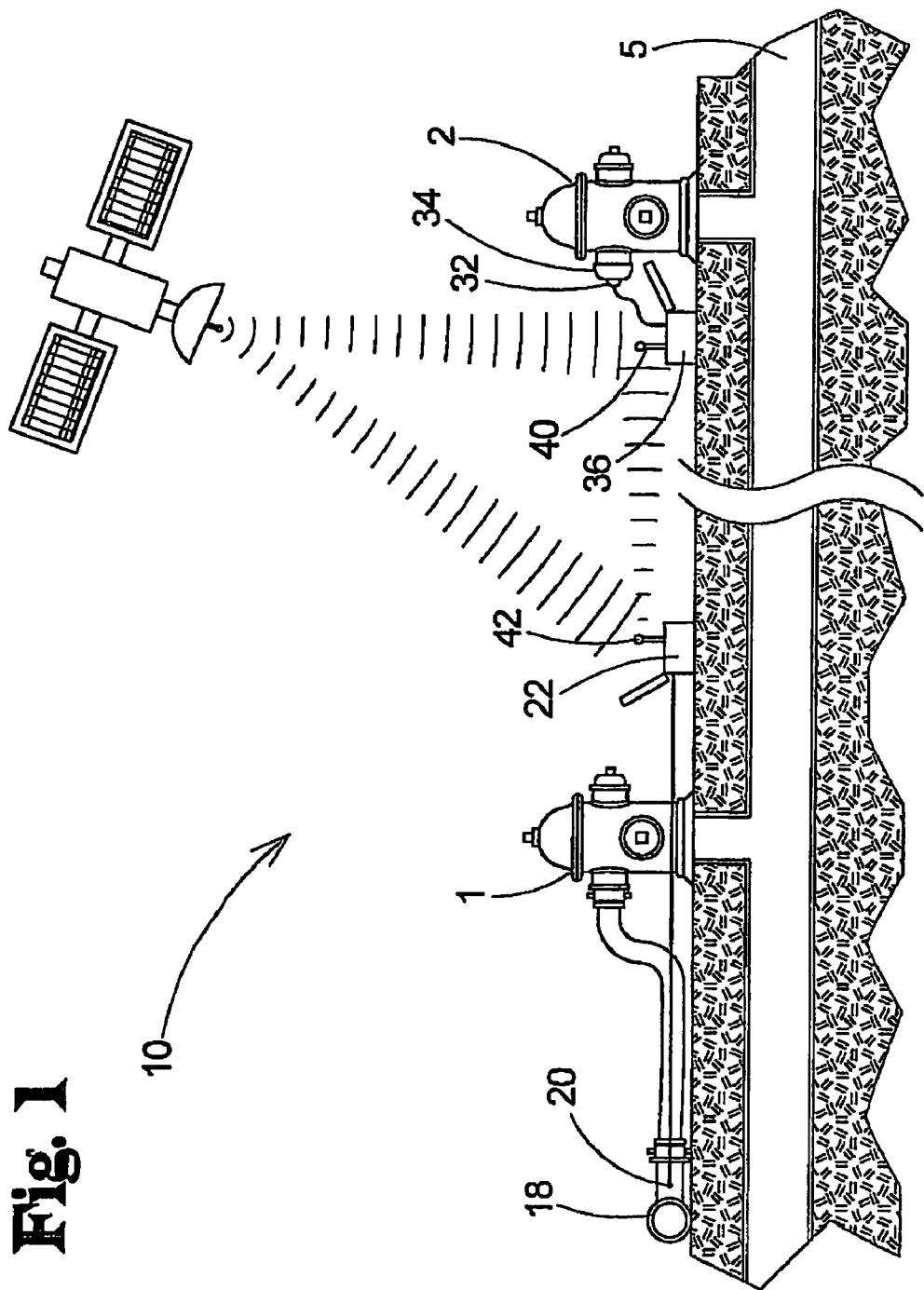
FIG. 1 is a schematic diagrammatic view of a new flow testing system for fluid networks according to the apparatus, system and method described herein.
Figure 2:
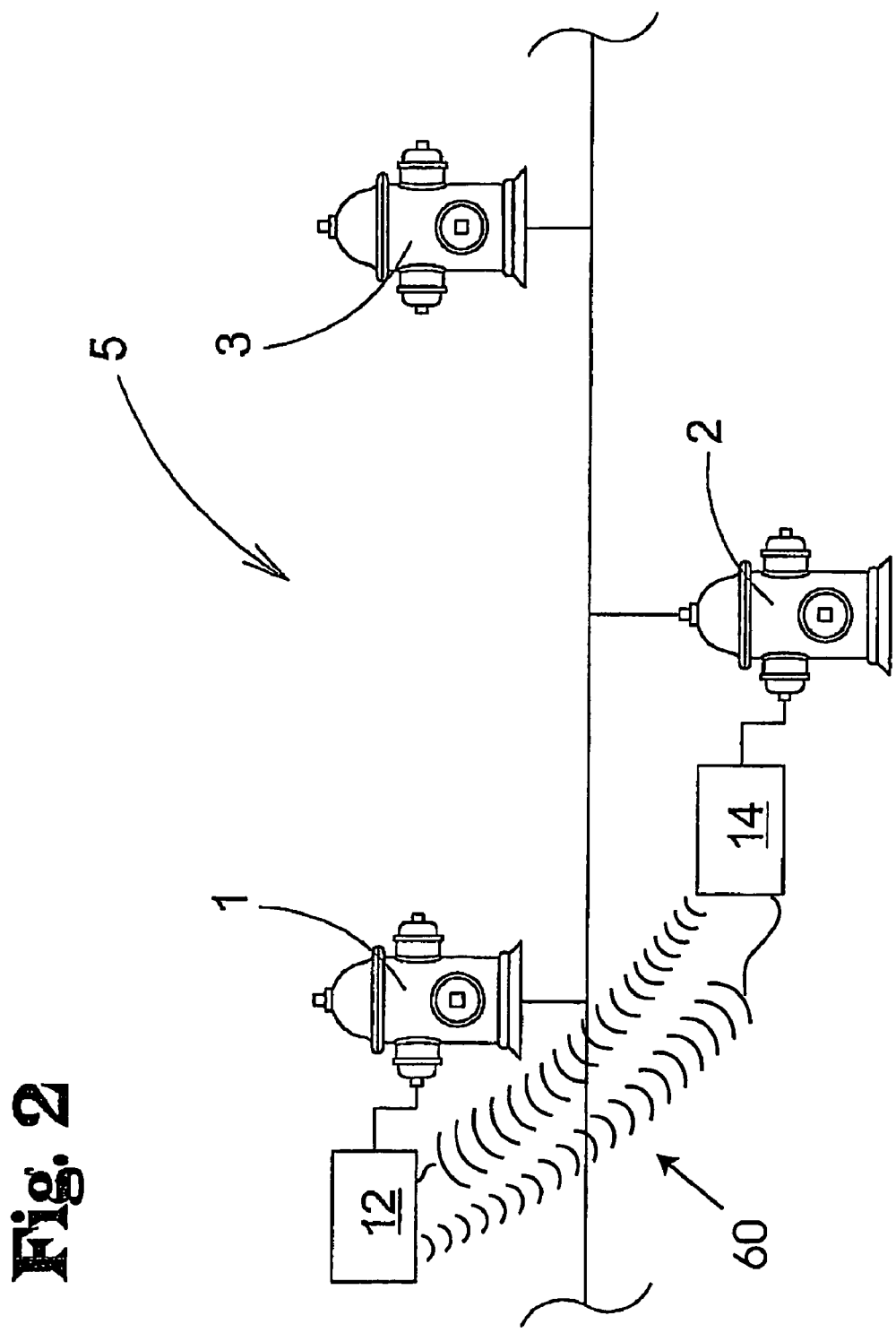
FIG. 2 is a schematic diagrammatic view of the apparatus and system described herein applied to a water supply system.

One aspect of the invention involves a flow testing system 10 (FIG. 1) for conducting a test event for detecting fluid characteristics in a network of fluid-carrying pipes (see FIG. 2). The invention is highly suitable for use on water system 5, such as are maintained by municipalities or water districts, that includes a plurality of outlets (in addition to those provided for customers of the water supply system) for supplying water for, for example, fire fighting and fire suppression. Typically, these fire suppression outlets take the form of hydrants 1 located adjacent to streets of the municipality. Although the use of the flow testing system 10 is not limited to these hydrants 1, the system 10 will be described in terms of use with the hydrants with the understanding that it could be utilized with other outlets on the water supply system 5.

Water supply systems 5 often include a plurality of the hydrants 1-3 (see FIG. 2) located along the network of water mains that comprise the system 5, and the hydrants may be freestanding or may be mounted on a building. The hydrants 1-3 are spaced or separated from each other by distances that may range from approximately 100 feet or less to approximately 300 feet or more, and likely a significantly greater distance in rural or less populated areas. Two adjacent 1, 2 hydrants on the network of a water supply system 5 thus may not be physically or closely adjacent, but do not have any other hydrants between them on a particular water main (but branches of water main between the two hydrants may have hydrants thereon). Hydrants 1, 3 that are proximate to each other on the network may have other hydrants 2 located on the network in between the two proximate hydrants, but usually only one hydrant or possibly two hydrants would be located between the proximate hydrants for flow rate testing or testing for fire flow, although proximate hydrants are not necessarily limited to these scenarios. For flow velocity testing or C-factor testing, all hydrants in a main system would be closed except for the flow unit being tested.

The flow testing system 10 of the invention may comprise a flow unit 12 (see FIG. 2) that is configured to interface with a flow hydrant 1 and measure flow characteristics of flow from the hydrant 1, and a pressure unit 14 that is configured to interface with a test hydrant 2 that is configured to measure pressure characteristics of fluid at the test hydrant 1. The terminology applied to the units for the purposes of this description is not intended to be limited or to indicate the only or sole function of the respective units, and each units may include additional capabilities of measurement beyond what is suggested by the "flow" and "pressure" terminology. Furthermore, the use of the terminology "unit" is not intended to limit the components and functionality of that unit to a single case or housing, although it will be realized that providing the components and functionality of the unit in a single case or housing can be highly beneficial to the use in the field of the inventive system 10. The test hydrant 2 is the hydrant whose capacity is being tested, and the flow hydrant 1 is being flushed to draw down the system 5 to a level where the ability of the test hydrant 2 to supply water is examined. In some utilizations of the system 10 the test hydrant 2 may be located proximate to the flow hydrant 1, and in some utilizations the test 2 and flow 1 hydrants are located adjacent to each other on the network. In most cases, the text 1 and flow 2 hydrants are physically remote from each other. It should be appreciated that more than one hydrant may be tested at the same time (or approximately the same time), and thus more than one of the pressure units 14 may be utilized during a test with the flow unit 12.

Figure 3:
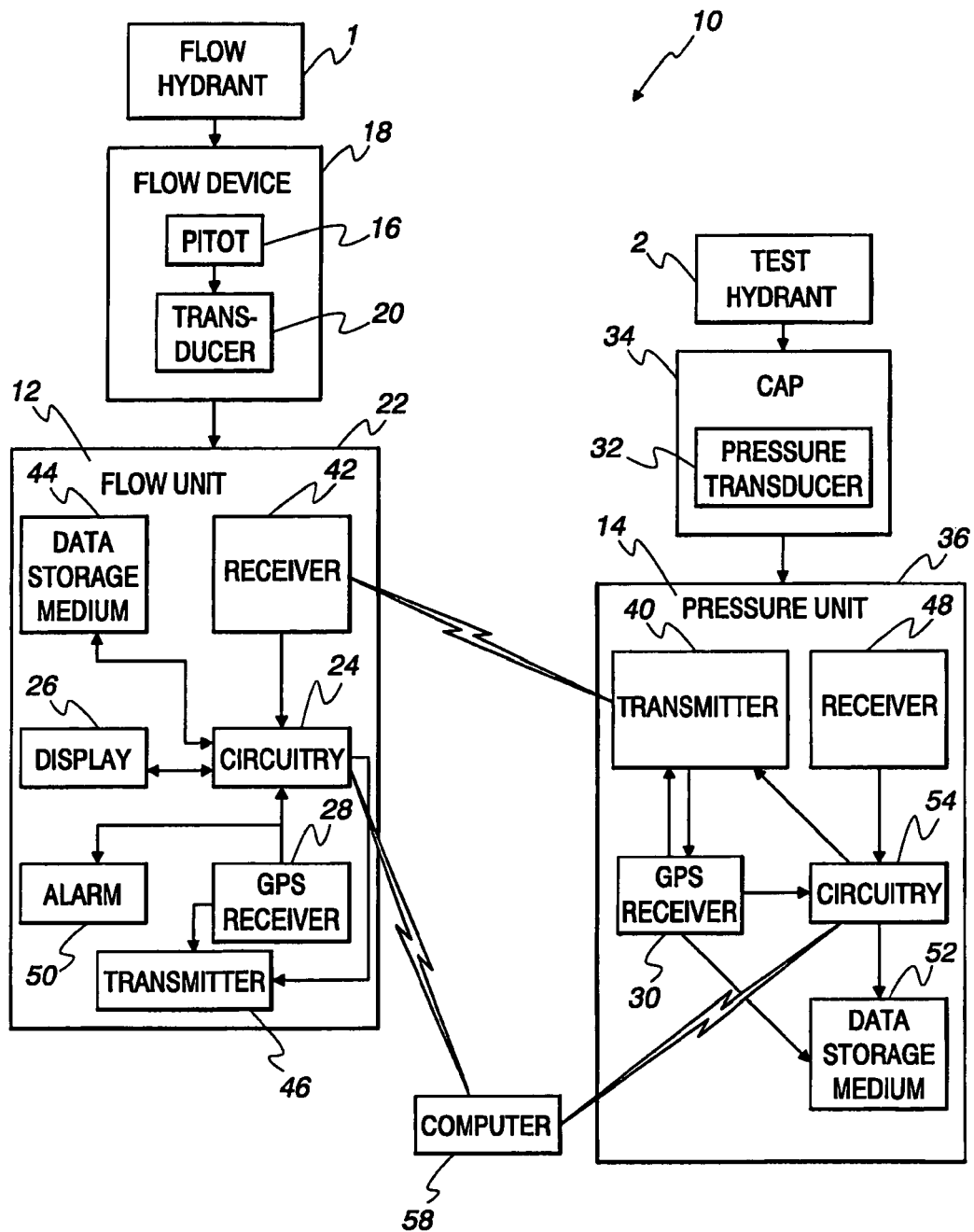
FIG. 3 is a schematic block diagram illustrating the apparatus, system and method described herein.

As seen in FIG. 3, the flow unit 12 of the invention may include the capability to measure a flow rate of fluid flowing from the flow hydrant 1. In an illustrative embodiment of the invention, the flow device 18 includes a pitot 16, or pitot tube, to measure the pitot pressure, and the pitot pressure may be used to calculate the flow rate of the water flow from the flow hydrant 1, based upon the geometry of a flow device 18 handling the flow from the flow hydrant 1, and other factors. The flow device 18 typically includes a passage through which the water flow from the flow hydrant 1 passes, and the pitot 16 is typically mounted in the passage to measure the pitot pressure of the water flow. The pitot 16 may be used in conjunction with a transducer for detecting the pitot pressure and converting the pitot pressure to an electrical signal. The flow device 18 may be connected to the flow hydrant 1 by a conduit or hose, and the flow device 18 may include a flow diffuser for diffusing the flow of water once the water has passed by the pitot 16. In other implementations, the diffuser may be a separate device that is attached to the flow device 18 by a conduit or hose. One suitable flow device 18 is available under the tradename HOSEMONSTER from Hydro Flow Products, Inc. of 1853 Hicks Road, Suite D, Rolling Meadows, IL 60008. Those skilled in the art will recognize that other suitable flow devices 18 are available that implement a pitot 16 for obtaining this measurement for deriving a flow rate calculation.

The flow unit 12 may include a flow unit housing 22 which is preferably portable so as to permit movement of the flow unit from hydrant location to hydrant location. Typically, although not necessarily, the flow unit housing 22 is physically separate from the flow device 18, and the pitot 16 of the flow device 18 (or the transducer in communication with the pitot) is connectable for communication with the flow unit 12, such as through electrical wires, although other means of communicating the pitot pressure, including tubing carrying the pitot pressure, may be employed.

The flow unit 12 may further include various hard-wired or programmable circuitry 24 (see FIG. 3) for detecting or receiving the pitot pressure signal from the transducer 20, and calculating the flow rate of the water from the flow hydrant 1 based upon the calculation using the pitot pressure. The circuitry 24 is preferably, although not necessarily, located on the flow unit housing 22. The flow unit 12 may further include a display 26 for displaying various types of information, such as the flow rate of the fluid calculated by the circuitry 24 and/or computer 58.

The pressure unit 14 of the system 10 may include the capability to detect a geographic position or location of the pressure unit, and thus the geographic position of the test hydrant 1 when the pressure unit is positioned adjacent to the test hydrant. This capability may be provided by a Global Positioning Satellite (GPS) receiver 30 that receives GPS signals from the various GPS satellites and converts the signals into geographic location information. In some embodiments of the invention, the flow unit 12 also includes the capability to detect a geographic position or location of the flow unit, and thus the location of the flow hydrant when the flow unit is positioned adjacent to the flow hydrant.

This capability may also be provided at the flow hydrant by a GPS receiver 28 in the flow unit 12 that receives GPS signals from the various GPS satellites and converts the signals into geographic location information.

The pressure unit 14 may further include the capability to measure the pressure of fluid at the test hydrant 2, which thus may provide the capability to measure both the static pressure and the residual pressure at the test hydrant 2, depending upon whether water is flowing from the flow hydrant 1. Both pressure measurements (static and residual pressure) may be made using the same device, such as a pressure transducer 32, that is mountable on the test hydrant in fluid communication with the water main. Illustratively, the pressure transducer 32 may be mounted on a cap 34 that is removably mountable on one of the outlets of the test hydrant, and the pressure transducer 32 is mounted in communication with an aperture (not shown) in the cap 34.

The pressure unit 14 may further include a pressure unit housing 36 which may be separate and movable with respect to the flow unit housing 22. The GPS receiver 30 may be mounted on the pressure unit housing 36. The pressure transducer 32 and the cap 34 may be separate from the pressure unit housing 36, but may be connected by wires for communicating signals from the pressure transducer 32 to circuitry 54 in the pressure unit housing 36.

The flow testing system 10 may further include transmitters 40, 46 in a first one of the units 12, 14 for transmitting data to a receiver in a second one of the units 12, 14. In embodiments of the invention, the transmitter 40 transmits the data wirelessly from the first unit to a receiver 42 in the second unit using, the example, radio frequency waves although other types and modes of wireless transmission may be used. Transmitter 46 may be configured to initiate the start of measuring static pressure by pressure transducer 32 by sending a RF signal from transmitter 46 in the flow unit to receiver 48 in pressure unit 14. Alternatively, when cap 34 is attached to hydrant 2 and that hydrant is opened, pressure transducer 32 will spontaneously measure the static pressure at test hydrant 2. The transmitters 40, 46 may be configured to transmit the data at a time point that is substantially simultaneous with a test event, such as when a residual pressure measurement is taken at the test hydrant 2, or when the pitot pressure measurement is taken at the flow hydrant 1. The data transmitted by the transmitter 40 may include pressure measurement data at the hydrant associated with the first unit or pressure unit at the time point of the test event. The data transmitted by the transmitter 46 may include calculated flow data at the flow hydrant associated with the second or flow unit at the time point of the test event. The data transmitted by the transmitter 40 may include geographical position data for the first or pressure unit (which will correspond closely with the geographical position of the hydrant associated with the first unit) at the time point of the test event.

In some of the most preferred embodiments of the invention, the first unit is the pressure unit 14 and the second unit is the flow unit 12, which permits a single operator (person) to be positioned at the flow hydrant 1 with the flow unit, while receiving pressure measurement data (e.g., regarding static and residual pressures) from the pressure unit 14, without requiring a second person to be positioned at the pressure unit to record pressure measurement readings. The pressure measurement data is transmitted by the transmitter 40 at the pressure unit 14 at the test hydrant 2, along with the geographical position data of the pressure unit 14, to the flow unit 12. However, the invention is not limited to this particular configuration, and the first unit may be the flow unit 12 and the second unit may be the pressure unit 14. A transmitter 46 also may be in the flow unit 12 to transmit to a receiver 48 in the pressure unit to receive such transmissions. As a result, the flow and pressure units can communicate with each other (as seen in FIG. 2 at 60) and can store data in data storage mediums 44 and 52 in each respective unit. The receiver 48 may communicate with circuitry 54 in the pressure unit such circuitry also connected to storage medium 52, transmitter 40 and GPS receiver 30.

Receivers 42 and 48 may be included for receiving data from the transmitters 40 and 46. Receiver 42 may be located with the flow unit 12 to receive data transmission concerning static and residual pressures as well as GPS data from the transmitter 40 with the pressure unit 14. Receiver 48 may be located in pressure unit 14 to receive data transmissions concerning pitot pressure, flow rates and flow velocity from flow unit 12.

Data storage mediums 44 and 52, such as a memory, may be included in the flow unit and pressure unit, respectively, for recording data, such as the pressure data and the geographic position data at each unit. Data measured at one unit may be stored at that unit as well as optionally transmitted and stored at the other unit. Geographic position data may be measured at the time point of the test event or just prior to the test event. The recorded and stored data may include static pressure data from the test hydrant 2 taken prior to the test event, residual pressure data from the test hydrant taken at the time of the test event, and pitot pressure data from the flow hydrant 1 taken at the time of the test event. A clock (not shown) also may be included at each unit or in computer 58 to determine the time and date of the tests and associate that time with the tests and the geographical location of the hydrants tested. The recorded data also may include data representative of flow rate data and/or flow velocity calculated from the pitot pressure data taken at the time of the test event. The recorded data may thus include data transmitted from the transmitter 40 to the receiver 42, and therefore the data storage medium 44 may be located with the second unit, which in many preferred embodiments is the flow unit 12, although the invention is not so limited and the data storage medium may be located with the pressure unit 14. Alternatively as described above, transmitters, receivers and storage mediums may be included in both units, pressure and flow.

Figure 4:
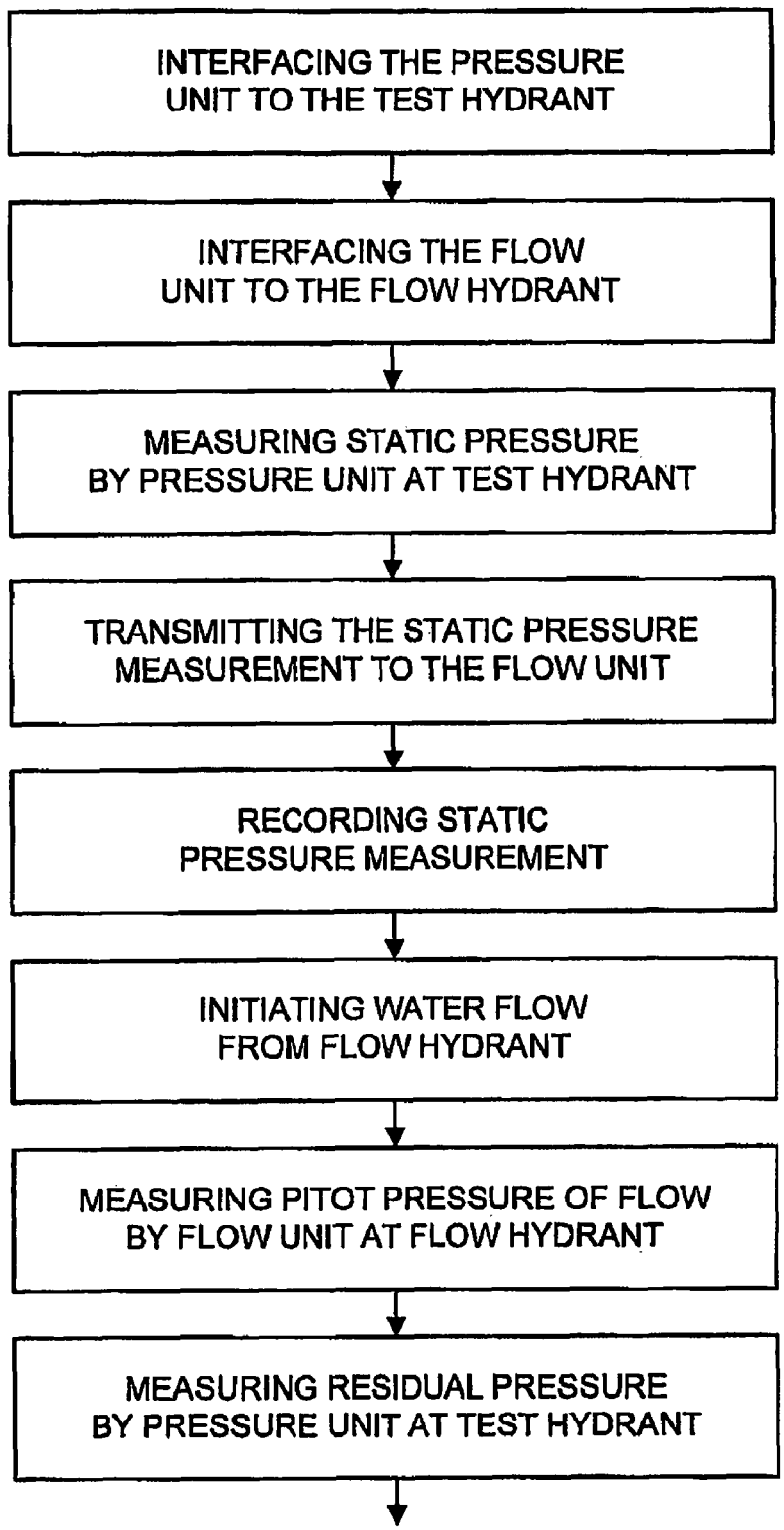
FIG. 4 is a schematic flow diagram of a first portion of an implementation of the flow characteristic testing by the apparatus, system and method described herein.
Figure 5:
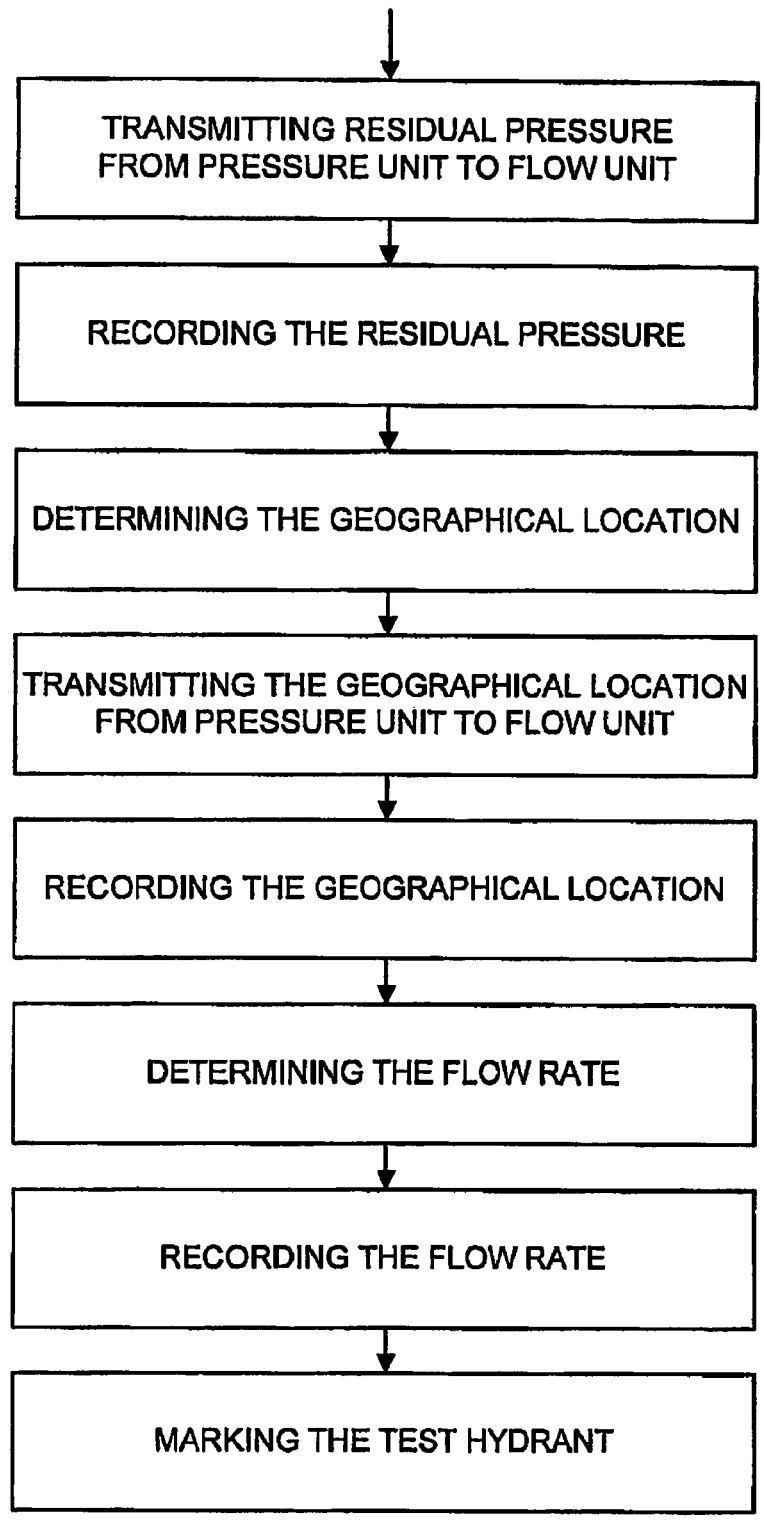
FIG. 5 is a schematic flow diagram of a second portion of an implementation of the apparatus, system and method described herein for flow characteristic testing.

Another aspect of the invention is a method of testing fluid flow in a network of fluid carrying pipes, as illustratively depicted in FIGS. 4 and 5, utilizing the flow unit 12 and the pressure unit 14 that are separately moveable with respect to each other, and not being physically connected.

The method may include interfacing the pressure unit 14 to the test hydrant 2, which may include the acts of positioning the pressure unit adjacent to the test hydrant, attaching a cap 34 to an outlet of the test hydrant, placing the pressure transducer 32 on the cap in fluid communication with fluid in the test hydrant, and may further include connecting the transducer 32 to the pressure unit 14 and a transmitter 40 of the pressure unit.

The method may further include interfacing the flow unit 12 to the flow hydrant 1. This aspect of the invention may further include selecting a flow hydrant 1 that is located proximate to the test hydrant 2, positioning the flow unit 12 adjacent to the flow hydrant 1, positioning a pitot 16 in a manner to intercept a flow of water from an outlet of the flow hydrant 2. In the latter aspect of the interfacing of the flow unit 12, the method may include attaching a flow device 18 having the pitot 16 to the flow hydrant 1 and attaching a conduit to the outlet of the flow hydrant 1 and to the flow device 18 to cause the water flow from the flow hydrant to move through the flow device and by the pitot 16.

Once the pressure unit 14 has been interfaced to the test hydrant 2, a static pressure measurement of the fluid at the test hydrant may be taken by the pressure unit 14. The measurement of the static pressure may include transmitting the static pressure measurement from the pressure unit 14 to the flow unit 12. The method may further include recording the static pressure measurement on the data storage medium 44, and may also include displaying the static pressure measurement on one of the units, such as the flow unit 12.

After the static pressure has been measured, flow of water through the flow hydrant may be initiated such as by opening an outlet of the flow hydrant to permit water to flow from the flow hydrant.

The method may further include measuring a pitot pressure in the flow from the flow hydrant, which may include sensing a pressure in the pitot 16 using the transducer 20, and measuring a residual pressure in the test hydrant 2. The measuring of the pitot and residual pressures is most usefully conducted substantially simultaneously, if not simultaneously. The pilot pressure may be recorded on the data storage medium 44 or may be transmitted to the pressure unit and stored in storage medium 52.

In implementations of the method, the residual pressure measurement is transmitted from the pressure unit 14 to the flow unit 12, which may be accomplished substantially simultaneously with the act of measuring the residual pressure. The transmitting of the residual pressure measurement from the pressure unit 14 to the flow unit 12 occurs automatically, without user intervention, or by user initiation of a RF transmission signal from the flow unit to the pressure unit. The measurement and transmission of the residual pressure measurement from the pressure unit 14 to the flow unit 12 may occur continuously after measurement of the static pressure and the data representative of the residual pressure measurements may be stored as a function of time in either or both storage mediums 44 and 52. The flow unit 12 receives the residual pressure measurements from the pressure unit, and the residual pressure measurements may be displayed on the flow unit.

The method may also include determining a geographical location of the pressure unit 14, which generally corresponds to the location of the test hydrant adjacent to the pressure unit.

The act of determining the geographical location may be accomplished at substantially the same time as measuring the residual pressure. The determination of geographical location may be accomplished by receiving GPS signals by the GPS receiver 30 and determining the geographical location from the GPS signals. The geographical location of the pressure unit 14 is transmitted to the flow unit 12, and may be transmitted to the flow unit with transmission of the residual pressure measurement. The data representative of the GPS determined positions of the pressure unit and flow units when mounted on hydrants may be stored in storage mediums 44 or 52 or both such mediums.

The pitot pressure measurement and the residual pressure measurement may be recorded simultaneously at the flow unit 12 and stored in medium 44 or 52 or both. The recordation of the measurements may be triggered by receiving a command from a user to simultaneously record the pitot and residual pressure measurement. The geographical location of the pressure unit 14, as well as the geographical position of the flow unit 12 in those units 12 including a GPS receiver 28, may be recorded simultaneously with the pressure measurements as described above, to create a record with the pressures, location, and optionally the time of the testing.

A computer 56 may be hard wired to flow unit 12 or wirelessly connected or interfaced to flow unit 12 and/or pressure unit 14. The computer supplies a capability of making calculations from the data taken at the units, but also can supply a clock for providing the time and date of the tests. The wireless connection for the computer to the units can be through a modem or through a telephone modem connection when needed. A flow rate from the flow hydrant 1 may be determined, such as by calculating the flow rate using the pitot pressure measurement, and the flow rate may be recorded in the data storage medium 44. The test hydrant 2 may then be marked with a marking that indicates a suitable flow rate for the test hydrant based upon the fire flow testing using the system. In a preferred implementation of the invention, the marking comprises a band that is positionable about a portion of the hydrant for providing an indication of the suitable flow rate of the particular hydrant. The band may bear a visually discernable indication, such as, for example, a color, of a suitable maximum flow rate for the hydrant. The band may also bear a machine-discernable indication, such as, for example, a bar code, of the suitable maximum flow rate and may also include an indication of other data, such as an identification number for the hydrant, which may be used to recall or download data about the characteristics of the hydrant from a database. The bar code may be scanned by a scanner when the hydrant needs to be used, for example, to extinguish a fire.

In various embodiments of the invention, one of the units 12, 14 and most preferably the flow unit 12, may be provided with an alarm 50 that is triggered by the occurrence of a pressure condition in the test hydrant 2 detected by the pressure unit 14. In some embodiments, the alarm 50 is triggered when a pressure, such as residual pressure, is detected by the pressure unit 14 that is below a threshold level at the test hydrant. The alarm 50 may produce an audibly-perceptible alarm (e.g., a siren or buzzer) or a visually-perceptible alarm (e.g., a flashing light or flashing icon on a display). The operation of the alarm 50 may be turned off and on depending upon the circumstances. The alarm 50 may be configured to be triggered when the pressure at the test hydrant 2 falls below a threshold pressure of, for example, approximately 20 psi. It is typically desirable to avoid pressures in the water supply system 5 that fall below approximately 20 psi. Thus, during high water usage events such as fire fighting, it is desirable to monitor the pressure in the local portion of the water supply system 5 to verify that the water being drawn from the supply system 5 by, for example, a pumper fire fighting truck, does not cause the residual water pressure to drop below a threshold level such as the 20 psi level.

Figure 6:
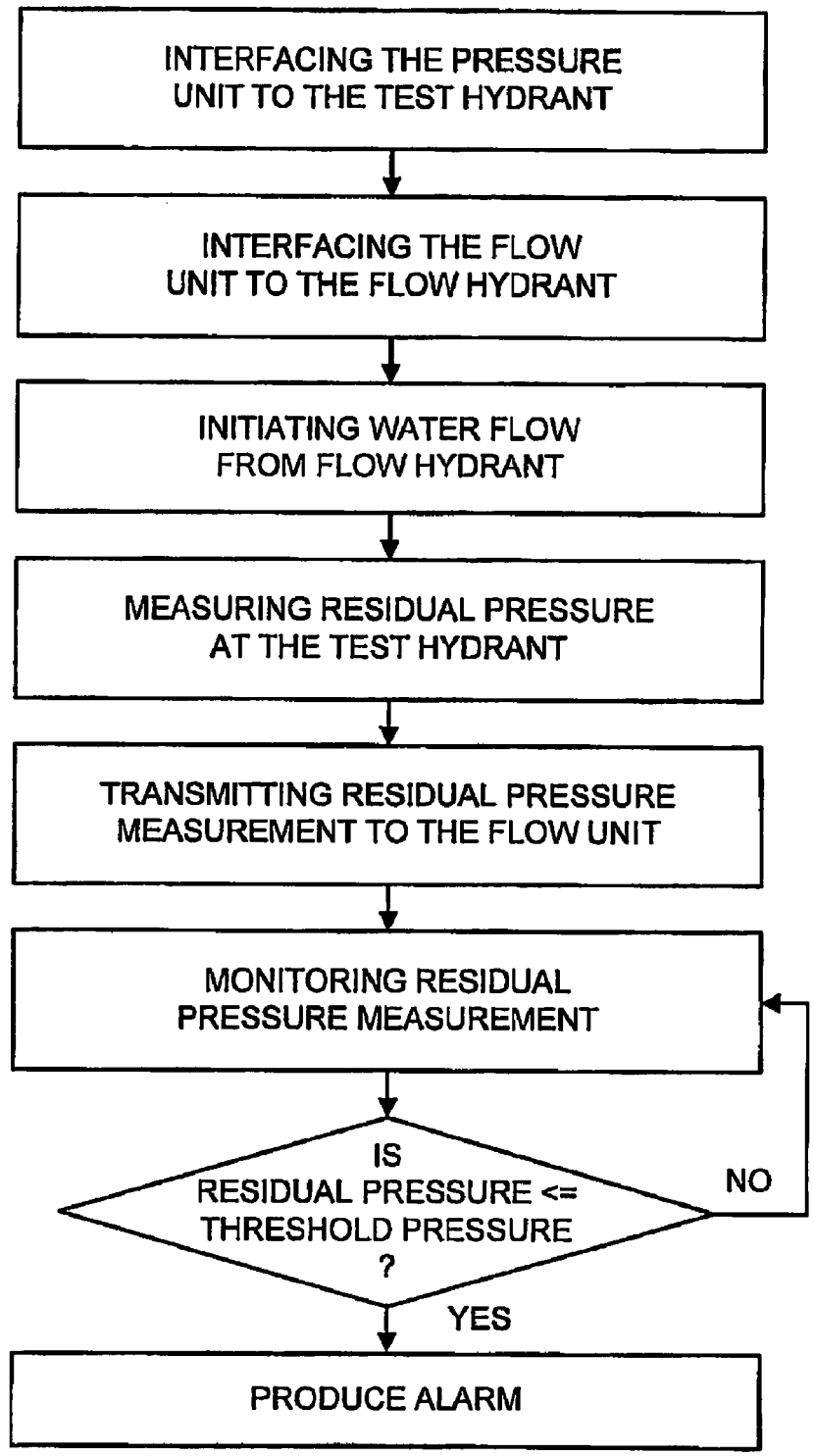
FIG. 6 is a schematic flow diagram of another implementation of the apparatus, system and method described herein for monitoring high water usage events such as fire fighting.
Figure 7:
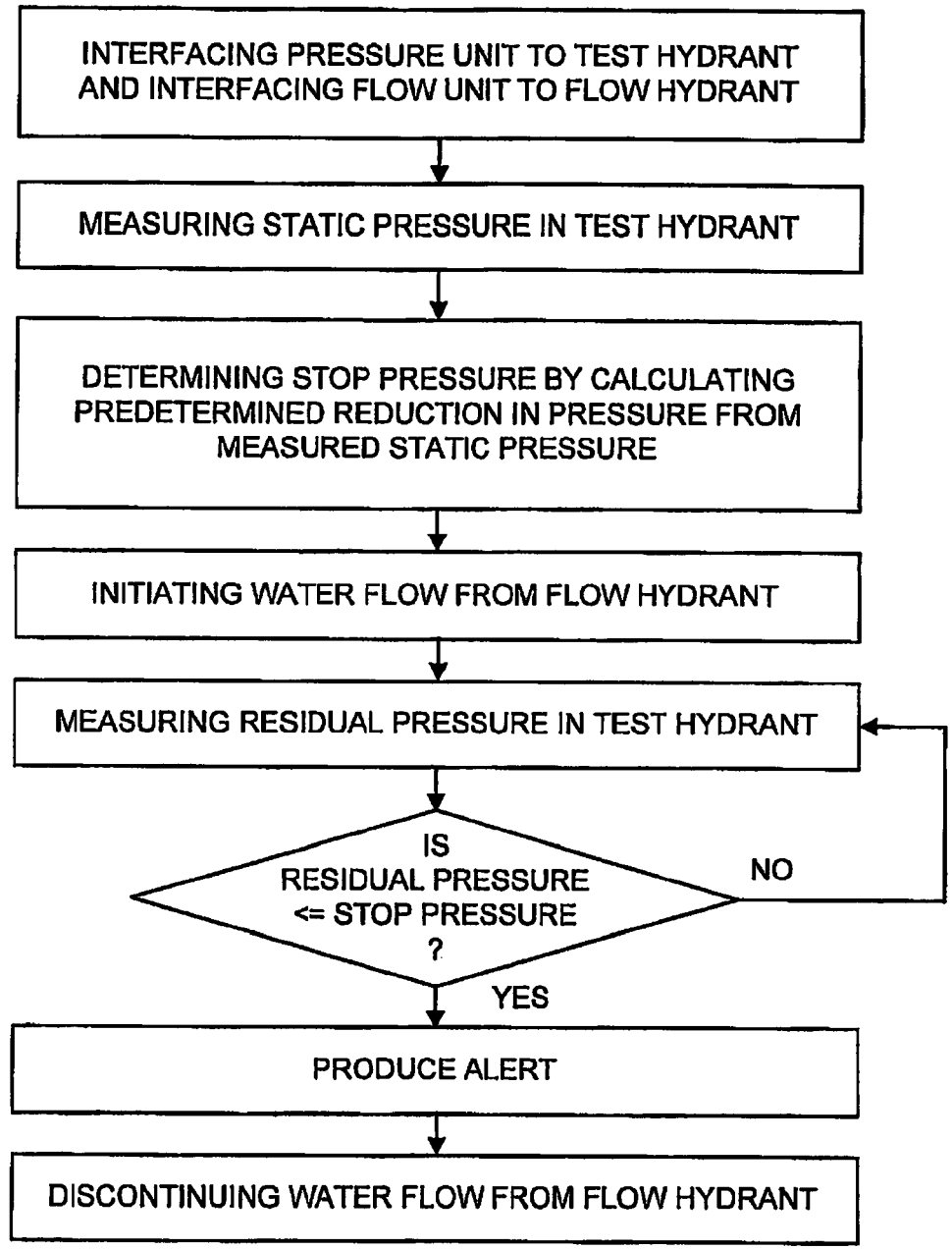
FIG. 7 is a schematic flow diagram of still another implementation of the apparatus, system and method described herein for facilitating the monitoring of pressure change during flow testing.

Embodiments of the invention so configured are thus useful for use during fire fighting events by fire fighting personnel to monitor the (residual) pressure in the water supply system 5 at a hydrant proximate to a hydrant from which water is being drawn from the system 5 (see FIG. 6). The system 10 is suitable to provide a warning to the personnel if the (residual) pressure in the system measured at the test hydrant falls below a preset or predetermined threshold pressure (or optionally below a predetermined percentage of the normal pressure), such as, for example, the approximately 20 psi level. The alarm, whether audible or visual or both, may be perceived by the fire fighting personnel who can make suitable adjustments to the pumper equipment to restore a residual pressure above the approximately 20 psi level. Optionally, the flow unit 12 may be positioned next to the flow hydrant 1 supplying the fire fighting water and proximate to the pumper drawing water from the flow hydrant, as well as the personnel operating the controls of the pumper fire fighting truck. The personnel operating the controls at the flow unit 12 has a continuous display (on the display 26) of the residual pressure measured by the pressure unit 14 and transmitted to the flow unit 12. The operation of the alarm 50 may continue and persist until the residual pressure rises above the threshold pressure (for example, above approximately 20 PSI).

In various embodiments and implementations of the invention, the system 10 may include additional functionality for alerting the user of the system if and when the residual pressure in the water supply system 5 has dropped below a predetermined or desired pressure level. This feature can be useful for alerting the user that the pressure level in the water supply system 5 has been reduced by a predetermined fraction or proportion from the initial static pressure. In some flow testing, it is desirable to reduce the pressure level by approximately 25%, so that the residual pressure is approximately 25% of the initial, static pressure when the pitot pressure (and residual pressure) are measured. (Other fractional reductions may be used.)

If the user or operator is alerted when the residual pressure reaches the desired reduction from the static pressure level, the user is then able to initiate the measurement of the residual and pitot pressures, and then terminate the flow of water from the flow hydrant, to thereby minimize any waste of water by allowing the flow to continue beyond what is necessary to capture the desired measurements.

In one mode of operation of the system to accomplish the alerting of the user to the desired reduction in pressure in the water supply system (see FIG. 7), the pressure unit 14 is interfaced to the test hydrant 2 and the flow unit 12 is interfaced to the flow hydrant 3. The method further includes measuring the static pressure of the fluid at the test hydrant 2 by the pressure unit 14, and determining a stop pressure level by calculating a predetermined reduction of pressure from the static pressure. The flow of water through the flow hydrant 3 may be initiated. The residual pressure may be measured in the test hydrant 2, and an alert may be produced if the residual pressure measurement is equal to or less than the stop pressure level. In other words, when or at the time that the residual pressure measurement is detected by the system 10 to have reached or fallen below the stop pressure level, an alert (such as, for example, an audible or visual alert) is produced that may be a single alert of finite duration, or intermittent, or may be continuous until the residual pressure rises above the stop pressure level, or the system 10 is reset or turned off.

With respect to the above description then, it is to be realized that the optimum dimensional relationships for the parts of the invention, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present invention.

Therefore, the foregoing is consider as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An apparatus which is effective for measuring a fluid pressure at a first hydrant and wirelessly communicating data representative of a measured pressure to a second hydrant, the apparatus comprising:
    a pressure measuring device which is mountable on the first hydrant and which is effective for measuring pitot pressure at the first hydrant;
    a transmitter which is effective for wirelessly transmitting data representative of a measured fluid pressure at the first hydrant to a receiver at a second hydrant; and
    a storage medium which is effective for storing data representative of a measured fluid pressure at at least one of the hydrants.

2. The apparatus of claim 1 wherein the apparatus further includes a receiver for receiving data from the second hydrant, the receiver being in communication with the storage medium for storing the data from the second hydrant.

3. The apparatus of claim 1 wherein the apparatus further includes a receiver for receiving data from the second hydrant, the receiver being in communication with the storage medium for storing the data from the second hydrant;
    wherein the pressure measuring device is effective for measuring the least residual pressure;
    wherein the apparatus further includes a computer control which calculates a fluid flow from the measured pitot pressure;
    wherein the fluid flow is the flow rate of fluid; and
    wherein the fluid flow is the velocity of a fluid.

4. The apparatus of claim 2 wherein the pressure measuring device is effective for measuring the least residual pressure.

5. The apparatus of claim 2 wherein the apparatus further includes a computer control which calculates a fluid flow from the measured pitot pressure.

6. The apparatus of claim 5 wherein the fluid flow is the flow rate of fluid.

7. The apparatus of claim 5 wherein the fluid flow is the velocity of a fluid.

* * * * *